United States Patent
Tomonaga

(10) Patent No.: US 7,995,146 B2
(45) Date of Patent: Aug. 9, 2011

(54) IMAGE PROCESSING APPARATUS AND IMAGE PROCESSING METHOD

(75) Inventor: Eiichiro Tomonaga, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 79 days.

(21) Appl. No.: 12/561,080

(22) Filed: Sep. 16, 2009

(65) Prior Publication Data

US 2010/0214472 A1    Aug. 26, 2010

(30) Foreign Application Priority Data

Feb. 25, 2009   (JP) ................................ 2009-042456

(51) Int. Cl.
*H04N 9/74*    (2006.01)
(52) U.S. Cl. .................... 348/581; 348/582; 348/672
(58) Field of Classification Search .................. 348/554, 348/441, 581, 582, 458, 459, 672, 625, 630, 348/448, 450–453; 382/168, 172, 263; H04N 7/01, H04N 11/20, 5/21, 3/27, 9/74, 5/14
See application file for complete search history.

(56) References Cited

U.S. PATENT DOCUMENTS

| | | | |
|---|---|---|---|
| 6,771,319 | B2 | 8/2004 | Konuma |
| 7,319,496 | B2 * | 1/2008 | Uchida et al. ................. 348/625 |
| 2002/0085122 | A1 | 7/2002 | Konuma |
| 2008/0239151 | A1 | 10/2008 | Tomonaga et al. |
| 2009/0172754 | A1 | 7/2009 | Furukawa |

FOREIGN PATENT DOCUMENTS

| | | |
|---|---|---|
| JP | H9-326922 | 12/1997 |
| JP | 2000-13595 | 1/2000 |
| JP | 2000-32287 | 1/2000 |
| JP | 2002-64761 | 2/2002 |
| JP | 2003-85556 | 3/2003 |
| JP | 2006-287506 | 10/2006 |
| JP | 2007-036946 | 2/2007 |
| JP | 2007-221415 | 8/2007 |
| JP | 2007-248935 | 9/2007 |
| JP | 2007-310837 | 11/2007 |
| JP | 2008-67316 | 3/2008 |
| JP | 2008-252701 | 10/2008 |
| JP | 2008-295022 | 12/2008 |
| JP | 2008-295023 | 12/2008 |

OTHER PUBLICATIONS

Japanese Office Action dated Jan. 26, 2010 for application No. 2009-042456 (U.S. Appl. No. 12/561,080) (English Translation).

* cited by examiner

*Primary Examiner* — Sherrie Hsia
(74) *Attorney, Agent, or Firm* — Blakely, Sokoloff, Taylor & Zafman LLP

(57) ABSTRACT

According to one embodiment, an image processing apparatus includes a scaling converter, a luminance histogram detector, a determination module, and a super resolution processor. The scaling converter converts a first image signal to a second image signal having more pixels. The luminance histogram detector detects a luminance histogram. The determination module determines whether the second image signal includes a graphics image based on the luminance histogram. The super resolution processor converts the second image signal to a third image signal with a higher resolution than that of the second image signal, and performs sharpening based on the reference gain. When the second image signal includes a graphics image, the super resolution processor sets the gain of sharpening below the reference gain.

8 Claims, 5 Drawing Sheets

IMAGE PROCESSING APPARATUS AND IMAGE PROCESSING METHOD

CROSS-REFERENCE TO RELATED APPLICATIONS

This application is based upon and claims the benefit of priority from Japanese Patent Application No. 2009-042456, filed Feb. 25, 2009, the entire contents of which are incorporated herein by reference.

BACKGROUND

1. Field

One embodiment of the invention relates to an image processing apparatus and an image processing method.

2. Description of the Related Art

There have been image processing apparatuses that are know as performing conversion (hereinafter, "scaling") on an input image signal to convert the number of pixels thereof to the number compatible with a display device. More specifically, such an image processing apparatus performs scaling on an image with standard definition (SD) resolution (720× 480 pixels) to convert the resolution to, for example, 1440× 1080 pixels (see, for example, Japanese Patent Application Publication (KOKAI) No. 2006-287506). Besides, there have been image processing apparatuses that are know as performing sharpening on an image of an input image signal to increase the resolution of the image (see, for example, Japanese Patent Application Publication (KOKAI) No. 2007-310837).

However, if sharpening is performed on an input image after scaling is performed thereon, in the case of a graphics image that has a sharp peak at a predetermined luminance gray level differently from a natural image in which the luminance gray level gradually changes, the noise is emphasized, resulting in significant degradation of the image. This is because sharpening is a process to be applied to a natural image. Therefore, if sharpening is performed on a graphics image to achieve an effect equivalent to that on a natural image, noise is likely to occur in pixels increased to enhance the resolution of the image.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
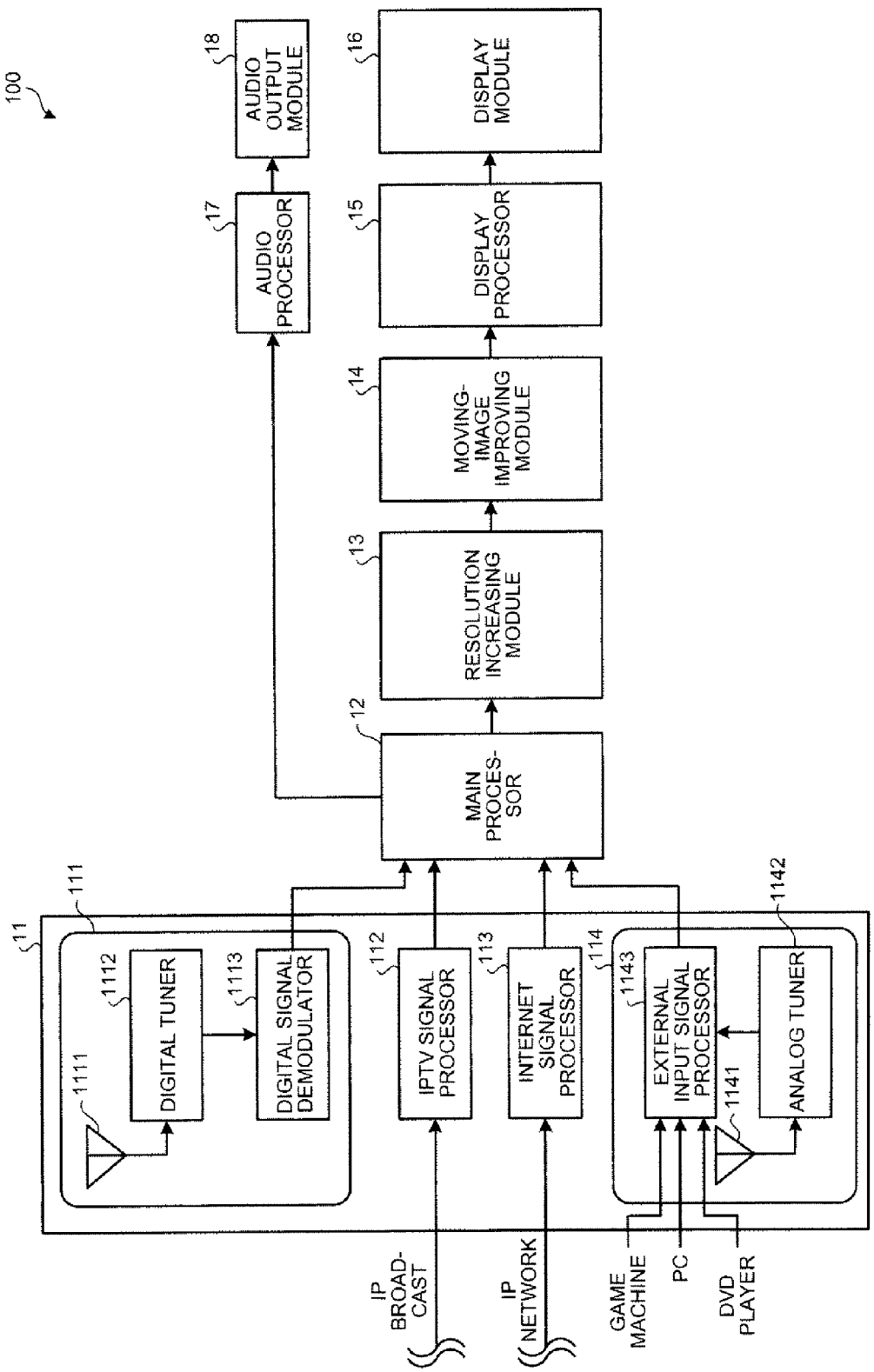
FIG. 1 is an exemplary schematic block diagram of an image display apparatus according to an embodiment of the invention.

Various embodiments according to the invention will be described hereinafter with reference to the accompanying drawings. In general, according to one embodiment of the invention, an image processing apparatus comprises a scaling converter, a luminance histogram detector, a determination module, a super resolution converter, and a super resolution processor. The scaling converter is configured to convert a first image signal with a first resolution to a second image signal with a second resolution having more pixels than the first image signal. The luminance histogram detector is configured to detect a luminance histogram indicating output frequency of each luminance level in an image of the second image signal. The determination module is configured to determine whether the image of the second image signal includes a graphics image having a sharp peak at a predetermined luminance gray level based on the luminance histogram. The super resolution converter is configured to perform scaling to convert the second image signal to a third image signal with a third resolution higher than the second resolution by interpolating the second image signal to increase the pixels based on a preset reference gain, and sharpening. The super resolution processor is configured to perform scaling to convert the second image signal to the third image signal by increasing the pixels using a super resolution technology, and sharpening based on the preset reference gain. When the determination module determines that the image of the second image signal includes a graphics image, the super resolution processor sets the gain of the sharpening to a value lower than the reference gain.

According to another embodiment of the invention, there is provided an image processing method applied to an image processing apparatus. The image processing apparatus converts a first image signal with a first resolution to a second image signal with a second resolution higher than the first resolution, converts the second image signal to a third image signal with a third resolution higher than the second resolution by interpolating the second image signal to increase the pixels based on a preset reference gain and performs sharpening. The image processing apparatus converts the first image signal to the second image signal having more pixels than the first image signal, and performs scaling to convert the second image signal to the third image signal by increasing the pixels using a super resolution technology and sharpening based on the preset reference gain. The image processing method comprises: a luminance histogram detector detecting a luminance histogram indicating output frequency of each luminance level in an image of the second image signal; and a determination module determining whether the image of the second image signal includes a graphics image having a sharp peak at a predetermined luminance gray level based on the luminance histogram. When the determination module determines that the image of the second image signal includes a graphics image, the super resolution processor sets the gain of the sharpening to a value lower than the reference gain.

FIG. 1 is a schematic block diagram of an image display apparatus 100 according to an embodiment of the invention. As illustrated in FIG. 1, the image display apparatus 100 comprises a video signal input module 11, a main processor 12, a resolution increasing module 13, a moving-image improving module 14, a display processor 15, a display module 16, an audio processor 17, and an audio output module 18.

The video signal input module 11 comprises a digital broadcast receiver 111, an Internet protocol television (IPTV) signal processor 112, an Internet signal processor 113, and an external input module 114. The digital broadcast receiver 111 receives a video signal to be displayed. The Internet signal processor 113 receives data transmitted via an Internet protocol (IP) network such as the Internet. The external input module 114 receives input of an analog signal. The term "video signal" as used herein includes audio signals (audio data) as well as image signals (image data) corresponding to still images and moving images.

The digital broadcast receiver 111 comprises a digital antenna 1111, a digital tuner 1112, and a digital signal demodulator 1113. The digital antenna 1111 receives digital broadcasting such as broadcast satellite (BS) broadcasting, communications satellite (CS) broadcasting, and digital terrestrial broadcasting. The digital tuner 1112 is used to select a digital broadcast channel. The digital signal demodulator 1113 demodulates a digital broadcast signal and outputs it to the main processor 12 as a digital video signal.

The IPTV signal processor 112 receives IP broadcasting transmitted over a dedicated IP network, and outputs it to the main processor 12 as a digital video signal.

The Internet signal processor 113 receives data (a still image, a moving image, etc.) transmitted through an IP network such as the Internet, and outputs it to the main processor 12 as a digital video signal.

The external input module 114 comprises an analog antenna 1141, an analog tuner 1142, and an external input signal processor 1143. The analog antenna 1141 receives analog broadcasting. The analog tuner 1142 is used to select an analog broadcast channel. The external input signal processor 1143 performs signal processing such as analog-to-digital (A/D) conversion on an analog signal, and outputs it to the main processor 12 as a digital video signal. The external input signal processor 1143 is provided with a terminal (not illustrated) for connection to an external device such as a game machine, a personal computer (PC), a digital versatile disk (DVD) player. The external input signal processor 1143 performs the signal processing also on an analog signal received from an external device through the terminal.

The main processor 12 separates a video signal received by the video signal input module 11 into an image signal and an audio signal. The main processor 12 performs predetermined signal processing on the image signal and then outputs it to the resolution increasing module 13. Meanwhile, the main processor 12 outputs the audio signal to the audio processor 17.

Examples of the signal processing performed by the main processor 12 include format conversion to convert the format of the image signal to a predetermined format (for example, MPEG, etc.), MPEG decoding, scaling, and superimposition of an electronic program guide, a menu screen used for on-screen display (OSD) and the like on a graphics image.

The main processor 12 performs scaling or scale conversion to convert the resolution (first resolution) of an image signal to a predetermined resolution (second resolution) with pixels more than those of the first resolution. For example, in the case of moving image data input from a DVD player or the like, the main processor 12 converts each frame of the moving image data from the SD resolution (720×480 pixels) to a resolution of 1440×1080 pixels, i.e., more pixels than those of the SD resolution. Incidentally, upon receipt of moving image data in a frame size of 1440×1080 pixels, the main processor 12 does not need to perform scaling.

The scale conversion performed by the main processor 12 is different from super resolution conversion, which will be described later, in that the resolution of an image is simply converted to a predetermined resolution (for example, a resolution of 1440×1080 pixels) without using a super resolution technology in which a pixel value is estimated. For convenience of description, an image before scaling will hereinafter be referred to as "low resolution image" (low resolution frame), an image after scaling will hereinafter be referred to as "intermediate resolution image" (intermediate resolution frame), and an image having undergone scaling using the super resolution technology and sharpening will hereinafter be referred to as "high resolution image" (high resolution frame).

The resolution increasing module 13 receives an image signal of an intermediate resolution image output from the main processor 12 frame by frame. The resolution increasing module 13 performs super resolution conversion, which will be described later, on the image signal to generate a high resolution image signal compatible with a display device. The detailed configuration of the resolution increasing module 13 will be described later.

The moving-image improving module 14 performs frame rate conversion. More specifically, the moving-image improving module 14 generates an interpolation frame from image data (an image signal) consisting of a plurality of high resolution frames received from the resolution increasing module 13 to increase the frame rate of the image data. In the frame rate conversion, the moving-image improving module 14 performs motion compensation based on two high resolution frames and generates an interpolation frame.

More specifically, the moving-image improving module 14 receives a high resolution frame subjected to the super resolution conversion output from the resolution increasing module 13. Meanwhile, the moving-image improving module 14 reads an immediately preceding frame, i.e., a high resolution frame subjected to the super resolution conversion one frame prior to the high resolution frame received from the resolution increasing module 13, out of a buffer memory (not illustrated) or the like. The moving-image improving module 14 calculates a motion vector from the two high resolution frames to perform motion compensation, and, based on the result, obtains an interpolation frame to be interpolated between the two high resolution frames. Such interpolation frame generation may be performed using known or commonly used technologies as disclosed in, for example, Japanese Patent Application Publication (KOKAI) No. 2008-35404. This technology of interpolation frame generation is cited by way of example and not by way of limitation. The moving-image improving module 14 may employ any other technology as long as it is for generating an interpolation frame by performing motion compensation of a plurality of frames.

For example, upon receipt of an image signal with a frame rate of 60 frames per second (fps) from the resolution increasing module 13, the moving-image improving module 14 generates an image signal with a frame rate of 120 fps by the interpolation frame generation, and outputs it to the display processor 15.

The display processor 15 comprises a display driver and controls display of an image signal received from the moving-image improving module 14 on the display module 16. The display module 16 comprises a display device such as a liquid crystal display (LCD) panel, a plasma panel, or a surface-conduction electron-emitter display (SED) panel. The display module 16 displays an image corresponding to an image signal on the screen under the control of the display processor 15.

The audio processor 17 converts a digital audio signal received from the main processor 12 into an analog audio signal in a format reproducible by the audio output module 18. The audio processor 17 then outputs the analog audio signal to the audio output module 18. The audio output module 18 may be a speaker or the like. Upon receipt of the analog audio signal from the audio processor 17, the audio output module 18 outputs it as audio.

Figure 2:
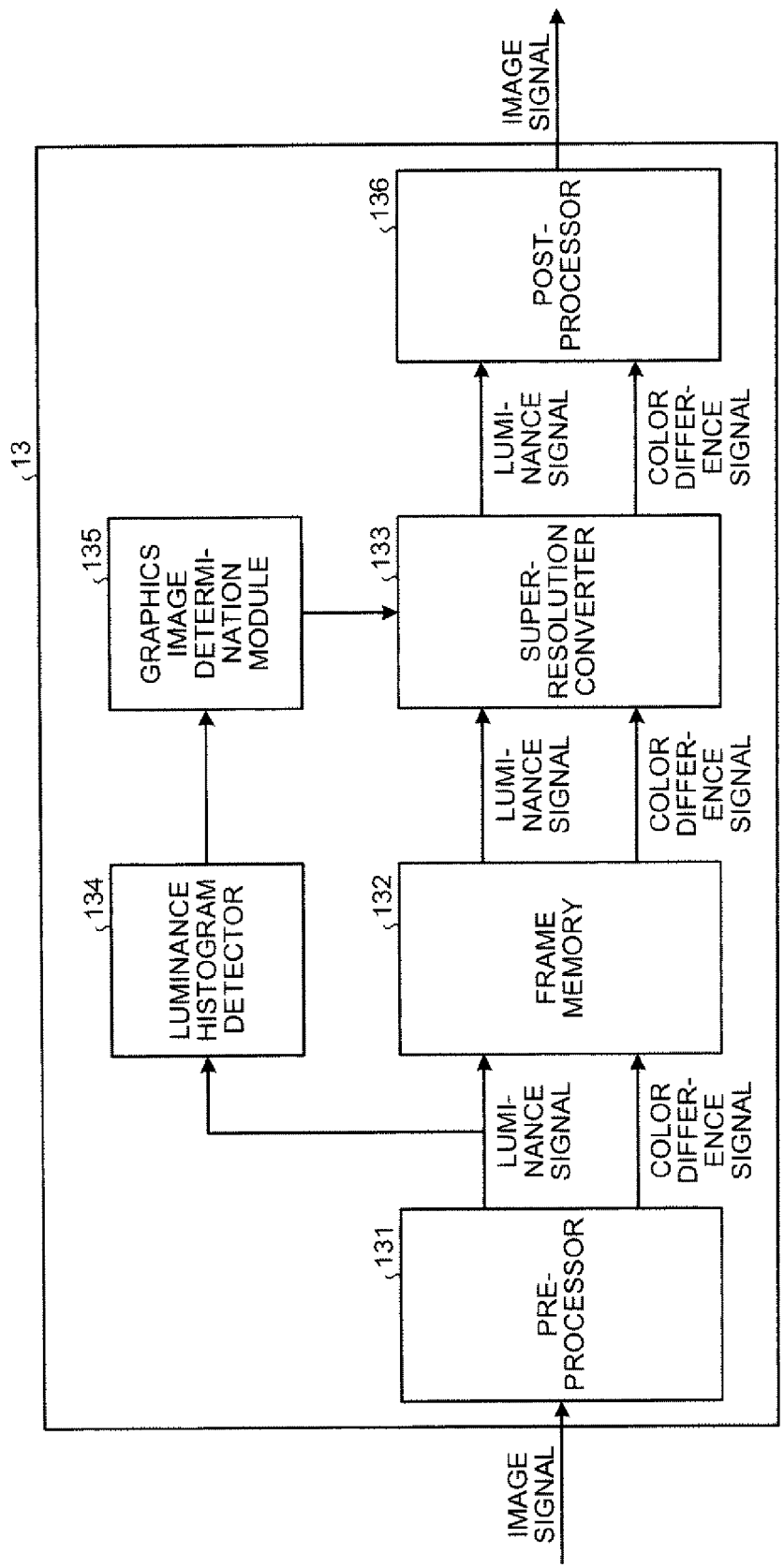
FIG. 2 is an exemplary block diagram of a resolution increasing module in the embodiment.

A description will now be given of the detailed configuration of the resolution increasing module 13. FIG. 2 is a block diagram of the resolution increasing module 13. As illustrated in FIG. 2, the resolution increasing module 13 comprises a preprocessor 131, a frame memory 132, a super resolution converter 133, a luminance histogram detector 134, a graphics image determination module 135, and a post-processor 136.

The preprocessor 131 performs preprocessing on an image signal (a luminance signal and a color difference signal of an intermediate resolution image) received from the main processor 12. The preprocessor 131 then outputs the luminance signal to the frame memory 132 and the luminance histogram detector 134 as well as outputting the color difference signal to the frame memory 132. Examples of the preprocessing include interlace/progressive (IP) conversion and noise reduction (NR) processing to remove noise from an image signal.

More specifically, as the IP conversion, the preprocessor 131 detects motion of an image in an image signal and determines whether the image signal represents a still image or a moving image. When the image signal represents a still image, the preprocessor 131 performs still image interpolation. On the other hand, when the image signal represents a moving image, the preprocessor 131 performs moving image interpolation. As the NR processing, the preprocessor 131 corrects the contour of an image, reduces image blur and glare, suppresses excessive equalizing (high-frequency enhancement), and corrects camera shake blur caused by the horizontal movement of a camera.

If an image signal from the main processor 12 has not been separated into a luminance signal (a Y signal) and a color difference signal (Cb and Cr signals) in a format such as YCbCr, the preprocessor 131 performs Y/C separation for separating the image signal into a luminance signal and a color difference signal.

The frame memory 132 stores an image signal received from the preprocessor 131 by one frame (by a horizontal scanning period), and then outputs it to the super resolution converter 133. In the resolution increasing module 13, the frame memory 132 delays an image signal by one frame so that, after the luminance histogram detector 134 detects a luminance histogram from a frame, the super resolution converter 133 reflects a determination result obtained by the graphics image determination module 135 based on the detection result of the luminance histogram detector 134 in the same frame.

The super resolution converter 133 performs image processing and sharpening on an intermediate resolution frame with second resolution received from the frame memory 132 to convert the second resolution to third resolution higher than the second resolution by using the super resolution technology (hereinafter, "super resolution conversion"). The super resolution converter 133 thereby obtains an image signal with the third resolution and generates a high resolution frame compatible with the resolution of the display device, and outputs it to the post-processor 136.

The term "super resolution conversion" as used herein refers to sharpening process, in which, from an image signal (an intermediate resolution frame) with the second resolution, an original pixel value is estimated to increase the pixels and thus to restore a high resolution image signal (a high resolution frame) with the third resolution higher than the second resolution.

The term "original pixel value" as used herein refers to the value of each pixel of an image signal obtained by, for example, photographing the same object as that of an image with the second resolution with a camera having high resolution pixels and capable of capturing an image with high resolution (the third resolution).

Besides, "original pixel value is estimated to increase the pixels" means to obtain the characteristics of images to find correlated pixels, and estimate an original pixel value from neighboring images (in the same frame or between frames) based on the correlation to increase the pixels.

More specifically, first, a temporary full HD high resolution image is generated from an original input image by upconversion (scaling). That is, based on information on a pair of adjacent pixels, a pixel is interpolated between the pixels to thereby generate a temporary full HD high resolution image. The interpolated pixel may not correspond to the one in the original input image. In other words, noise, edge distortion, and the like may occur due to a calculation error.

Next, an image is generated by down-converting the resolution of the temporary full HD high resolution image to that of the original input image based on an imaging model function. The imaging model function realizes the calculation of the same process as that a common camera converts information on the imaging device to an image signal.

Although the down-converted image is supposed to be the same as the original input image, a difference may be caused between the down-converted image and the original input image due to the calculation error or the like in the upconversion. By detecting the difference and correcting the difference based on information on neighboring pixels and the like to eliminate the calculation error, an output image is generated that has undergone the super resolution conversion and is similar to the original input image.

Namely, the super resolution conversion is a technology for, by comparison of the down-converted image and the original input image, restoring an image signal corresponding to the original input image. Incidentally, as the comparison and restoration are repeated more times, the accuracy of the super resolution conversion increases. In the super resolution conversion, the comparison and restoration may be performed only once, or may be repeated a plurality of times. If there is enough time such as, for example, when a recorded image is to be viewed later or when a time lag is allowed to be caused in the super resolution conversion, the super resolution conversion can be performed such that the comparison and restoration are repeated a plurality of times.

The super resolution conversion may be performed using known or commonly used technologies as disclosed in, for example, Japanese Patent Application Publication (KOKAI) Nos. 2007-310837, 2008-98803, and 2000-188680. In the embodiment, the super resolution conversion uses a technology of, for example, restoring an image with frequency components above the Nyquist frequency determined by the sampling rate of an input image.

If employing the super resolution conversion disclosed in Japanese Patent Application Publication (KOKAI) No. 2007-310837, the super resolution converter 133 sets a target pixel in each of a plurality of intermediate resolution frames, and sets a target image area so that it contains the target pixel. The super resolution converter 133 selects a plurality of correspondent points that correspond to a plurality of target image areas closest to a variation pattern of the pixel value in the target image area from a reference frame. The super resolution converter 133 sets a sample value of luminance of a correspondent point to the pixel value of a corresponding target pixel. The super resolution converter 133 calculates a pixel value for a high resolution frame having more pixels than the reference frame and corresponding to the reference frame based on the size of a plurality of sample values and layout of the correspondent points. Thus, the super resolution converter 133 estimates an original pixel value from an intermediate resolution frame, and increases the pixels to restore a high resolution frame.

If employing the super resolution conversion using self-congruency position search in the same frame image disclosed in Japanese Patent Application Publication (KOKAI) No. 2008-98803, the super resolution converter 133 calculates a first pixel position with the smallest error, i.e., a first error, by comparing errors of respective pixels in a search area of an intermediate resolution frame. The super resolution converter 133 calculates a position with the smallest error in the search area with decimal precision based on the first pixel position and the first error, and a second pixel position around a first pixel and a second error thereof. The super resolution converter 133 calculates a decimal-precision vector that has its end point at the position with the smallest error and its start point at a pixel of interest. The super resolution converter 133 calculates an extrapolation vector of the decimal-precision vector that has its end point at a pixel on a screen which is not in the search area based on the decimal-precision vector. The super resolution converter 133 calculates a pixel value for a high resolution image having more pixels than image data based on a pixel value obtained from the image data, the decimal-precision vector, and the extrapolation vector. In this manner, the super resolution converter 133 estimates an original pixel value from an intermediate resolution frame, and increases the pixels to restore a high resolution frame.

The super resolution converter 133 may employ the super resolution conversion disclosed in Japanese Patent Application Publication (KOKAI) No. 2000-188680 using mapping between a plurality of frames.

The above technologies of the super resolution conversion that may be performed by the super resolution converter 133 are cited by way of example and not by way of limitation. The super resolution converter 133 may employ various other technologies in which an original pixel value is estimated from an image signal with the second resolution to increase the pixels to thereby obtain a high resolution image signal.

The super resolution converter 133 sets the gain of sharpening (hereinafter, "sharpening parameter") based on the determination result of the graphics image determination module 135. Thus, the super resolution converter 133 performs sharpening process using the sharpening parameter. Examples of the sharpening parameter include a characteristic parameter such as a weighting factor for a filter to correct the degradation of image quality and an intensity parameter such as a weighting factor for the intensity of sharpening.

The characteristic parameter and the intensity parameter are each generally preset to a predetermined value (reference gain). If the graphics image determination module determines that an intermediate resolution frame includes a graphics image as the determination result, the characteristic parameter and the intensity parameter are each changed to a value lower than the predetermined value. By changing the characteristic parameter and the intensity parameter in this manner, the super resolution converter 133 can change the effect achieved by the correction of image quality degradation and the intensity of sharpening. More specifically, as the value of the parameter becomes higher than the predetermined value, the effect achieved by sharpening becomes larger compared to when the parameter is set to the predetermined value. On the other hand, as the value of the parameter becomes lower than the predetermined value, the effect achieved by sharpening becomes smaller compared to when the parameter is set to the predetermined value. Besides, when the parameter is set to zero, the minimum effect is obtained (for example, no sharpening is performed).

The luminance histogram detector 134 adds up luminance signals received from the preprocessor 131 for one frame. Thus, the luminance histogram detector 134 detects a luminance histogram indicating the frequency of each luminance level in an intermediate resolution frame.

The graphics image determination module 135 determines whether the intermediate resolution frame includes a graphics image having a sharp peak at a predetermined luminance gray level based on the luminance histogram received from the luminance histogram detector 134 as the detection result. When there is a sharp peak at the predetermined luminance gray level in the luminance histogram received from the luminance histogram detector 134, the graphics image determination module 135 determines that the intermediate resolution frame includes a graphics image. When the intermediate resolution frame includes a graphics image, for example, a predetermined area of the intermediate resolution frame may be simply a graphics image, or a graphics image is superimposed on a natural image in which the luminance gray level gradually changes.

Figure 3:
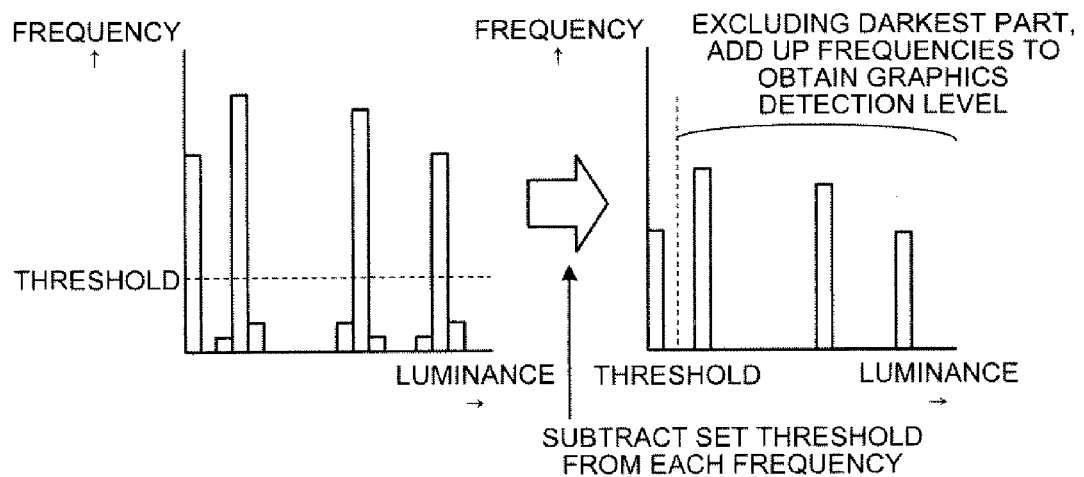
FIG. 3 is an exemplary conceptual diagram for determining whether a graphics image is included based on a luminance histogram in the embodiment.

More specifically, as illustrated in FIG. 3, in the luminance histogram received from the luminance histogram detector 134, if there is a sharp peak at a predetermined luminance level among luminance levels that appear more frequently than a preset threshold (a first threshold), the graphics image determination module 135 determines that the intermediate resolution frame includes a graphics image. With such a threshold, the graphics image determination module 135 can eliminate factors other than the graphics image (for example, a luminance level of an area other than the graphics image, etc.) from the intermediate resolution frame. This improves the accuracy of determination on the graphics image.

In addition, in the luminance histogram received from the luminance histogram detector 134, if there is a sharp peak at a predetermined luminance level higher than a preset threshold (a second threshold), the graphics image determination module 135 determines that the intermediate resolution frame includes a graphics image. It is often the case that the luminance levels converge at low values in dark video such as a movie. Therefore, with the threshold as described above, the graphics image determination module 135 can prevent a dark image from simply being determined as a graphics image. This also improves the accuracy of determination on the graphics image.

Further, in the luminance histogram received from the luminance histogram detector 134, if a plurality of sharp peaks are discretely present, the graphics image determination module 135 determines whether the intermediate resolution frame includes a graphics image based on the dispersion state of the peaks. More specifically, if luminance levels at which the sharp peaks are respectively present each correspond to a preset luminance level, the graphics image determination module 135 determines that the intermediate resolution frame includes a graphics image. In this manner, by determining whether the intermediate resolution frame includes a graphics image based on the dispersion state of a plurality of sharp peaks that are discretely present, it is possible to further improve the accuracy of determination on the graphics image.

The post-processor 136 performs image correction such as gamma correction, contrast stretch, gray level correction, and color management on an image consisting of high resolution frames generated by the super resolution converter 133. After the image correction, the post-processor 136 sequentially outputs the high resolution frames to the moving-image improving module 14 located at the latter stage. Incidentally, the resolution increasing module 13 may be configured such that the post-processor 136 does not perform the image correction.

Figure 4:
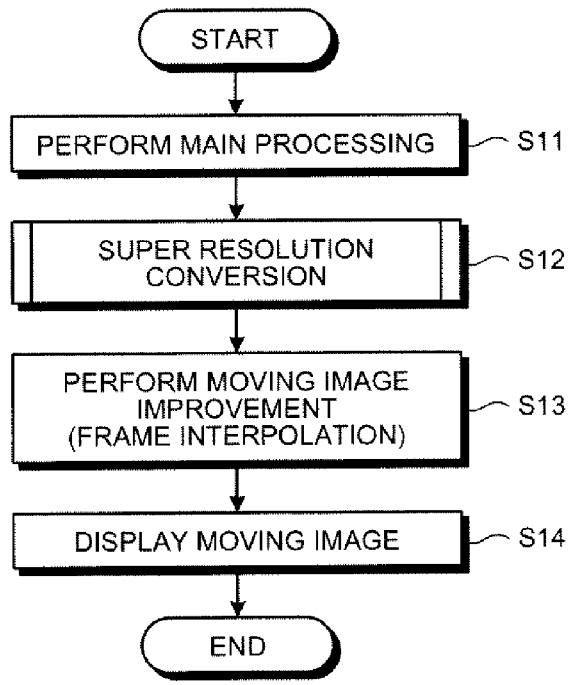
FIG. 4 is an exemplary flowchart of the operation of the image display apparatus in the embodiment.

With reference to FIG. 4, a description will be given of the operation of the image display apparatus 100. FIG. 4 is a flowchart of the operation of the image display apparatus 100 according to the embodiment. It is assumed herein that, at the start of the process, the video signal input module 11 performs predetermined processing such as digital demodulation on a video signal of digital broadcasting, etc. received by the digital broadcast receiver 111 or the like and inputs the video signal to the main processor 12. It is also assumed that other video signals than those of digital broadcasting are also input to the main processor 12.

As illustrated in FIG. 4, upon receipt of a video signal, the main processor 12 performs main processing such as format conversion and decoding of the video signal, separation of the video signal into an image signal and an audio signal, superimposition of a graphics image, scaling, etc. on the video signal (S11). After the main processing, the main processor 12 outputs the image signal to the resolution increasing module 13 and the audio signal to the audio processor 17.

The resolution increasing module 13 performs the super resolution conversion on the image signal (an intermediate resolution frame) with the second resolution received from the main processor 12 (S12). After the super resolution conversion, the resolution increasing module 13 outputs an image signal (a high resolution frame) with the third resolution to the moving-image improving module 14.

Thereafter, the moving-image improving module 14 performs moving image improvement on the image data consisting of high resolution frames generated by the super resolution converter 133. More specifically, the moving-image improving module 14 generates interpolation frames and interpolates them between the high resolution frames (S13). With this moving image improvement, the frame rate of the moving image changes, for example, from 60 fps to 120 fps. The moving-image improving module 14 outputs the image signal, the frame rate of which has been changed, to the display processor 15.

Then, the display processor 15 displays the moving image corresponding to the image signal, the frame rate of which has been changed, on the display module 16 (S14). Thus, the display module 16 displays the high resolution moving image with smooth motion.

Figure 5:
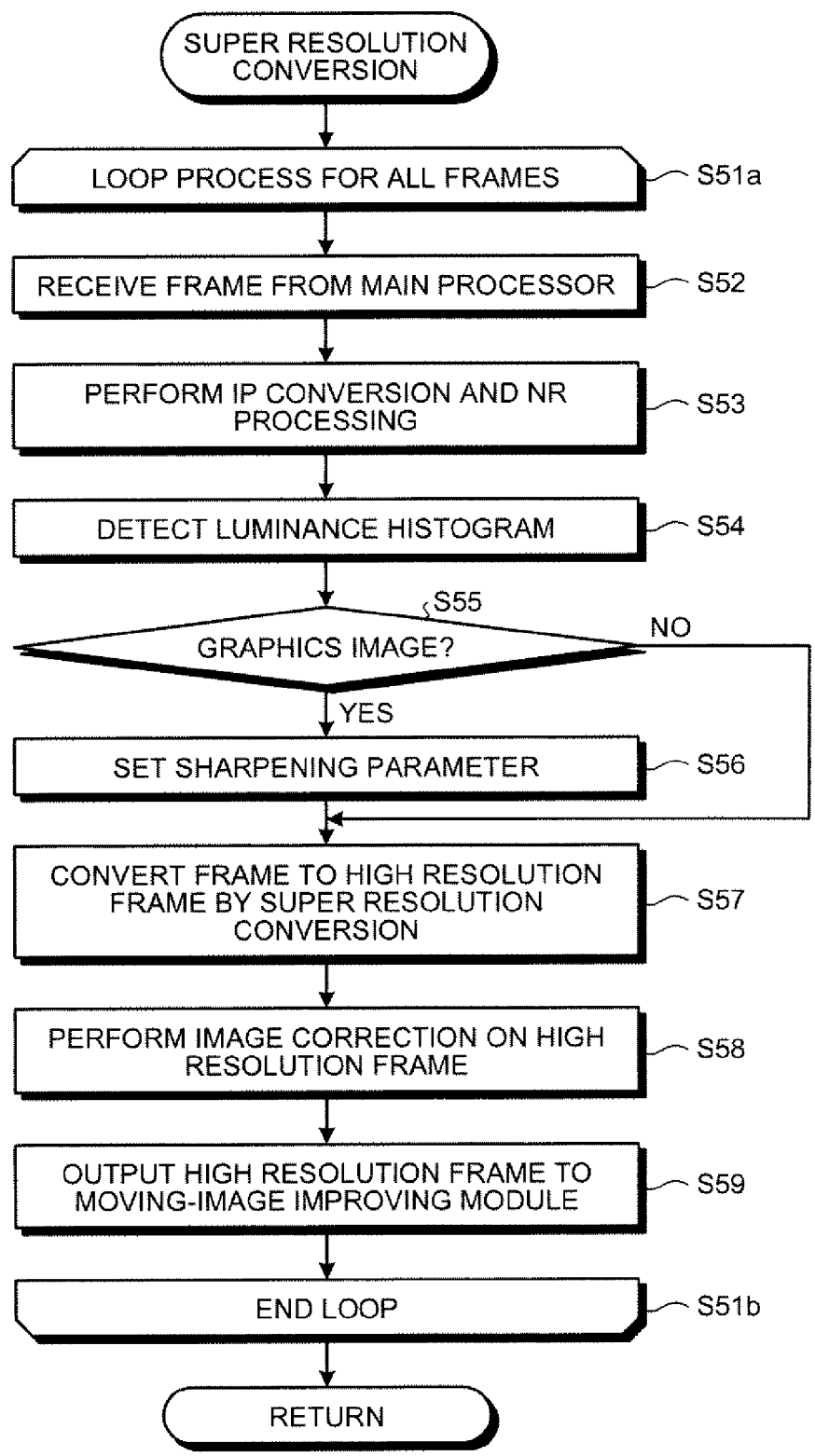
FIG. 5 is an exemplary flowchart of super resolution conversion performed by the resolution increasing module in the embodiment.

With reference to FIG. 5, a detailed description will be given of the super resolution conversion performed by the resolution increasing module 13 at S12 in FIG. 4. FIG. 5 is a flowchart of the super resolution conversion performed by the resolution increasing module 13 according to the embodiment.

As illustrated in FIG. 4, when the super resolution conversion starts at S12, the preprocessor 131 receives intermediate resolution frames sequentially output from the main processor 12 (S52). Subsequently, the preprocessor 131 performs the preprocessing, such as IP conversion and NR processing, on the intermediate resolution frames received from the main processor 12 (S53). The intermediate resolution frames (luminance signals and color difference signals) having undergone the preprocessing are stored in the frame memory 132. The luminance signals having undergone the preprocessing are also input to the luminance histogram detector 134.

The luminance histogram detector 134 adds up the luminance signals received from the preprocessor 131 for one frame, and detects a luminance histogram indicating the frequency of each luminance level (S54). The luminance histogram detector 134 inputs the luminance histogram to the graphics image determination module 135.

Upon receipt of the luminance histogram, the graphics image determination module 135 determines whether the intermediate resolution frame includes a graphics image based on the luminance histogram (S55). If the intermediate resolution frame includes a graphics image (Yes at S55), the super resolution converter 133 sets a value lower than a preset reference gain as a sharpening parameter (S56). More specifically, as has previously been described, if the intermediate resolution frame includes a graphics image, the super resolution converter 133 sets a value lower than a reference gain as a sharpening parameter to reduce the effect of sharpening, thereby reducing noise that occurs in the graphics image due to sharpening.

Then, the super resolution converter 133 performs the super resolution conversion on the intermediate resolution frame using the sharpening parameter (S57). With this, the intermediate resolution frame is converted to a high resolution frame. The high resolution frame obtained by the super resolution conversion is input to the post-processor 136.

Further, at S57, the super resolution converter 133 performs scaling on the high resolution frame obtained by the super resolution conversion to convert back to the intermediate resolution frame. The super resolution converter 133 compares the intermediate resolution frame with the intermediate resolution frame before the super resolution conversion to determine whether the pixels are correctly restored by the super resolution conversion. When there is a difference between the pixel values of the pixels of the intermediate resolution frame and those of the intermediate resolution frame before the super resolution conversion, the super resolution converter 133 determines that the pixels are not correctly restored. Accordingly, the super resolution converter 133 corrects the pixel values of the pixels restored by the super resolution conversion depending on the amount of the difference.

At S57, the process including the correction as just described may be referred to as super resolution conversion to convert the intermediate resolution frame to the high resolution frame. Additionally, in the correction described above, the sharpening parameter may include a parameter for setting a correction amount depending on the amount of the difference. Consequently, if the intermediate resolution frame includes a graphics image, a value lower than a reference parameter (gain) is set as the sharpening parameter, which decreases the correction amount for the pixel values of the pixels restored by the super resolution conversion. Thus, it is possible to reduce noise caused by the resolution conversion performed on the graphics image to be reflected in the correction.

After that, the post-processor 136 performs image correction such as gamma correction on the high resolution frame (S58), and then outputs the high resolution frame after the image correction to the moving-image improving module 14 (S59). The process from S52 to S59 is performed for all input moving image frames (S51*a*, S51*b*).

Figure 6:
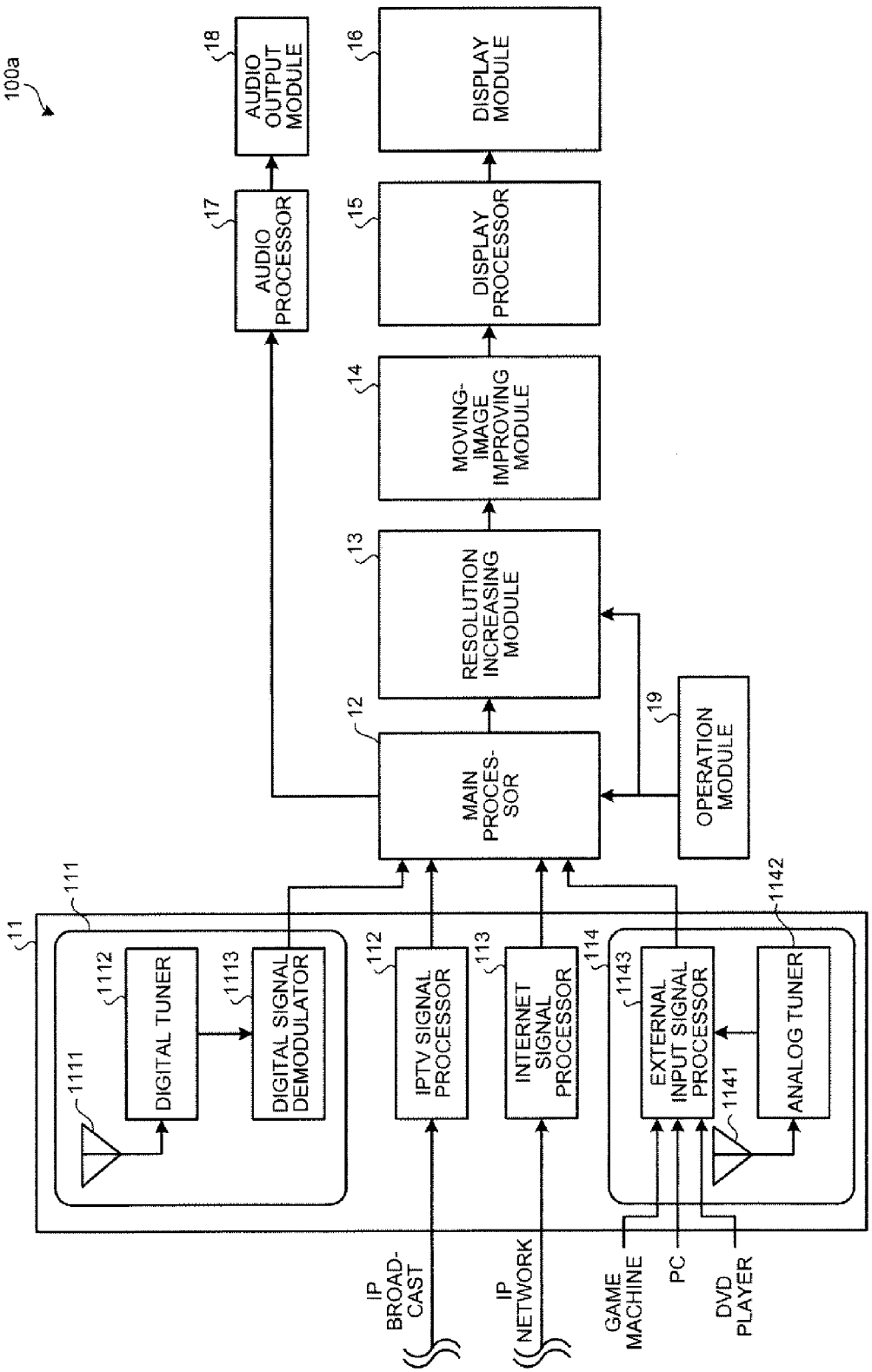
FIG. 6 is an exemplary schematic block diagram of an image display apparatus according to a modification of the embodiment.

A modification of the above embodiment will be described with reference to FIG. 6. FIG. 6 is a schematic block diagram of an image display apparatus 100*a* according to the modification. The image display apparatus 100*a* is of basically the same configuration as the image display apparatus 100 described above (for example, the resolution increasing module 13 has the same configuration as illustrated in FIG. 2). Therefore, constituent elements corresponding to those of the above embodiment are designated by the same reference numerals, and their description will not be repeated.

As illustrated in FIG. 6, the image display apparatus 100a further comprises, in addition to the constituent elements described above, an operation module 19 that receives input from the user. The operation module 19 may comprise operation keys or buttons such as a power button, numeric keys, alphabet keys, arrow keys, a select button, an enter key, and a mode switch button, and a pointing device such as a touch panel. The input provided by the user through the operation module 19 is output to the main processor 12 and the resolution increasing module 13.

In response to the input provided by the user through the operation module 19, the main processor 12 turns on/off the image display apparatus 100a, switches the digital broadcast receiver 111, the IPTV signal processor 112, the Internet signal processor 113, and the external input module 114 to receive a video signal, switches operation modes, and the like. When a menu screen is superimposed on a display screen for the OSD function, the main processor 12 may set various settings according to input that the user has provided through the operation module 19 using the menu screen.

The operation modes predefine the ON/OFF of operation related to the display of the display module 16 and the audio output of the audio output module 18, and the operation amount. The user can select a desired operation mode from the operation modes.

More specifically, examples of the operation modes include "standard mode", "cinema mode", "game mode", "manual setting mode", and "through mode". In the standard mode, the cinema mode, the game mode, etc., the operation amount is preset according to the type of video. More specifically, in the standard mode, processing is performed according to a preset reference value. In the cinema mode, processing is performed suitably to the reproduction of cinema video (video and audio). In the game mode, processing is performed suitably to the reproduction of game video (video and audio). In the manual setting mode, processing is performed based on the operation amount (including ON/OFF of the operation) that the user presets through the menu screen using the OSD function. In the through mode, only minimum necessary processing is performed while the other processing is OFF.

Incidentally, examples of the minimum necessary processing performed in the through mode include separation of an input video signal into an image signal and an audio signal, conversion performed on the audio signal by the audio processor 17, direct input of the image signal to the display processor 15, and control of the display on the display module 16. That is, the minimum necessary processing refers to processing to directly output an input video signal as an image and audio. On the other hand, the other processing is processing other than that described above. That is, the other processing refers to, for example, predetermined signal processing performed by the main processor 12, processing performed by the resolution increasing module 13 and the moving-image improving module 14, and the like.

The resolution increasing module 13 performs the super resolution conversion in an operation mode specified by the user through the operation module 19. More specifically, the preprocessor 131 switches ON/OFF of the IP conversion, the NR processing, and the like according to the operation mode specified by the user.

When changing the sharpening parameter to a value lower than a reference value, the graphics image determination module 135 adjusts the difference between the reference value and the value to which the sharpening parameter is to be changed according to the operation mode specified by the user. For example, if the operation mode is set to the standard mode, the graphics image determination module 135 adjusts the difference by a preset reference amount. Meanwhile, if the operation mode is set to the manual setting mode, the graphics image determination module 135 adjusts the difference by an amount corresponding to user settings (including zero).

Further, if the operation mode is set to the cinema mode, when the sharpening parameter is changed to a value lower than the reference gain or value, the difference between the reference gain and the value to which the sharpening parameter is to be changed is reduced to prevent the effect of sharpening from decreasing. This is because, in the cinema mode, etc., a higher emphasis is placed on the visual quality of cinema video (natural image) than on that of a graphics image.

Still further, if the operation mode is set to the game mode, when the sharpening parameter is changed to a value lower than the reference gain or value, the difference between the reference gain and the value to which the sharpening parameter is to be changed is increased to decrease the effect of sharpening. This is because, in the game mode, etc., a graphics image occupies a large part of the screen, and a higher emphasis is placed on the visual quality of the graphics image than on that of a natural image.

The post-processor 136 performs image correction, such as gamma correction, contrast stretch, gray level correction, and color management, corresponding to an operation mode specified by the user through the operation module 19. More specifically, the post-processor 136 performs image correction, such as gamma correction, contrast stretch, gray level correction, and color management, by an amount corresponding to an operation mode specified by the user.

The information processing apparatus of the above embodiment is described by way of example as being applied to an image display apparatus such as a digital TV comprising the display processor 15, the display module 16, the audio processor 17 and the audio output module 18; however, it can be applied to, for example, a tuner or a set-top box without having those modules. Further, the information processing apparatus of the above embodiment may be configured to comprise only the resolution increasing module 13, and simply perform the super resolution conversion on an input image signal and output it.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:
   a scaling converter configured to convert a first image signal with a first resolution to a second image signal with a second resolution having more pixels than the first image signal;

a luminance histogram detector configured to detect a luminance histogram indicating output frequency of each luminance level in an image of the second image signal;

a determination module configured to determine whether the image of the second image signal includes a graphics image having a sharp peak at a predetermined luminance gray level based on the luminance histogram; and a resolution increasing module configured to perform scaling to convert the second image signal to the third image, and sharpening based on a preset reference gain, wherein when the determination module determines that the image of the second image signal includes a graphics image, the resolution increasing module sets a gain of the sharpening to a value lower than the reference gain.

2. The image processing apparatus of claim 1, wherein, when the peak is present in luminance levels that appear more frequently than a preset first threshold in the luminance histogram, the determination module determines that the image of the second image signal includes a graphics image.

3. The image processing apparatus of claim 1, wherein, when the peak is present at a luminance level higher than a preset second threshold in the luminance histogram, the determination module determines that the image of the second image signal includes a graphics image.

4. The image processing apparatus of claim 1, wherein, when a plurality of peaks are discretely present in the luminance histogram, the determination module determines whether the image of the second image signal includes a graphics image based on dispersion state of the peaks.

5. The image processing apparatus of claim 1, wherein the resolution increasing module is configured to perform super resolution conversion to convert the second image signal to the third image signal by estimating an original pixel value from the second image signal and increasing the pixels.

6. The image processing apparatus of claim 1, further comprising an operation module configured to receive setting of an operation mode, wherein the resolution increasing module is configured to adjust a difference between the reference gain and the gain to be set depending on the operation mode.

7. An image processing method applied to an image processing apparatus comprising:

scaling by a resolution increasing module to convert a first image signal with a first resolution to a second image signal with a second resolution having more pixels than the first image signal;

converting by a resolution increasing module the second image signal to a third image signal with a third resolution higher than the second resolution;

sharpening by a resolution increasing module based on a preset reference gain;

detecting by a luminance histogram detector a luminance histogram indicating output frequency of each luminance level in an image of the second image signal;

determining by a determination module whether the image of the second image signal includes a graphics image having a sharp peak at a predetermined luminance gray level based on the luminance histogram; and when the image of the second image signal is determined to include a graphics image, setting by the resolution increasing module a gain of the sharpening to a value lower than the reference gain.

8. An image processing apparatus comprising:

a scaling converter configured to convert a first image signal with a first resolution to a second image signal with a second resolution having more pixels than the first image signal;

a luminance histogram detector configured to detect a luminance histogram indicating output frequency of each luminance level in an image of the second image signal;

a determination module configured to determine whether the image of the second image signal includes a graphics image having a sharp peak at a predetermined luminance gray level based on the luminance histogram; and a resolution increasing module configured to perform sharpening based on a preset reference gain, wherein when the determination module determines that the image of the second image signal includes a graphics image, the resolution increasing module sets a gain of the sharpening to a value lower than the reference gain.

* * * * *